(12) United States Patent
Fazilleau et al.

(10) Patent No.: US 8,217,808 B2
(45) Date of Patent: Jul. 10, 2012

(54) INCREMENTAL CODER AND METHOD FOR DETERMINING A VALUE OF VARIATION OF STABLE POSITIONS OF THE CODER

(75) Inventors: Gregory Fazilleau, Vendome (FR); Didier Guinier, Notre Dame d'Oe (FR)

(73) Assignee: Thales (FR)

( * ) Notice: Subject to any disclaimer, the term of this patent is extended or adjusted under 35 U.S.C. 154(b) by 0 days.

(21) Appl. No.: 12/973,606

(22) Filed: Dec. 20, 2010

(65) Prior Publication Data

US 2011/0316722 A1 Dec. 29, 2011

(30) Foreign Application Priority Data

Dec. 23, 2009 (FR) .................................... 09 06274

(51) Int. Cl.
*H03M 1/22* (2006.01)
(52) U.S. Cl. ............................... 341/11; 341/13
(58) Field of Classification Search .................. 341/11, 341/13, 14; 250/559.1, 234, 221, 231.13, 250/231.14, 237, 239, 231.18, 559.44, 559.04, 559.46, 231.16, 231.3, 231.4; 324/662, 658, 324/207.25
See application file for complete search history.

(56) References Cited

U.S. PATENT DOCUMENTS

| 4,461,015 | A | 7/1984 | Kulhavy |
| 6,304,091 | B1* | 10/2001 | Shahoian et al. ............. 324/662 |

FOREIGN PATENT DOCUMENTS

DE 101 26 077 A1 12/2002
* cited by examiner

*Primary Examiner* — Joseph Lauture
(74) *Attorney, Agent, or Firm* — Baker & Hostetler, LLP

(57) ABSTRACT

An incremental coder in which stable positions of the coder are defined by multiples of an increment of the coder. The coder computes a difference between a binary word obtained for a current stable position and a binary word obtained for a previous stable position, and computes the value of variation of stable positions by determining the integer part of the division of the difference by the number of increments between two stable positions.

6 Claims, 2 Drawing Sheets

INCREMENTAL CODER AND METHOD FOR DETERMINING A VALUE OF VARIATION OF STABLE POSITIONS OF THE CODER

CROSS-REFERENCE TO RELATED APPLICATION

This application claims priority to foreign French patent application No. FR 0906274, filed on Dec. 23, 2009, the disclosure of which is incorporated by reference in its entirety.

BACKGROUND

The invention relates to an incremental coder and to a method for determining the binary signals representing increments of relative position of two elements of the coder, the two elements being mobile with respect to one another. These coders, for example optical and angular, are used like potentiometers, for example for the manual control of electronic apparatuses which are sensitive to an input parameter that can vary continuously or almost continuously, but they are much more reliable than potentiometers. Typically, in an application in respect of aeronautical equipment, it is possible to use an optical angular coder to indicate to an automatic piloting computer an altitude or speed setpoint that the pilot chooses by actuating a control button which causes the coder to revolve. The reliability of the coder and of the information that it delivers is then an essential element of the coder.

An optical angular coder typically consists of a disc bearing regular marks, this disc being rotated using a (for example manual) control button. A photoelectric cell fixed in front of the disc detects the march past of the successive marks when the control button causes the disc to revolve. The marks are typically apertures in an opaque disc, a light-emitting diode being placed on one side of the disc and the photoelectric cell being placed on the other side.

Each passby of a mark constitutes an increment of one unit in the counting of the rotation of the disc. The angular resolution is determined by the angular interval of the marks arranged regularly over a revolution of the disc. To detect at one and the same time increments and decrements of angle of rotation when the direction of rotation is reversed, two photoelectric cells are provided, mutually offset physically by an odd number of quarter intervals. Thus, the lit/unlit logic states of the two cells are coded on two bits which successively take the following four values: 00, 01, 11, 10 when the disc rotates in one direction and the following four successive values 00, 10, 11, 01 when the disc rotates in the other, so that it is easy to determine, not only the occurrence of an increment of rotation (change of state of one of the bits) but also the direction of rotation (by comparison between a state of the cells and the immediately earlier state).

This type of coder is formed of an assemblage of mechanical parts and of optoelectronic components that it is tricky to fine tune. It is advantageous to reuse one and the same coder for several applications so as to standardize it and thus reduce production costs by virtue of bigger batches. The development costs can moreover be better distributed over a larger number of coders. When standardizing, a problem is encountered when the number of intervals of the coder varies from one application to another. For example, if the coder allows 48 angular positions for a rotation of a complete revolution, it is possible to use this coder for an application in which only 12 or 24 positions are necessary. Without changing the coding disc which preserves 48 binary increments, it is possible to carry out a simple mechanical adaptation to define 12 or 24 angular positions on which the coder can stop in a stable manner. In the succession of the above-described binary codings, only one value out of two will be used for a 24 position coder and one value out of four for a 12 position coder. It would be possible to adjust each coder of a batch individually so as to define the values chosen from among the four binary values but this increases the unit cost of a coder.

Moreover, let us take the example of a coder comprising two binary increments per stable positions. If during the enabling of the coder, the latter is at a stable position, then between this initial position and any other stable position there will be an even number of binary edges for the two codings. The difference between the current word and the origin word will therefore be even. A simple division by two will make it possible to determine in a definite manner a value of variation of stable positions. If on the other hand, during the enabling of the coder, the latter is not at a stable position, then between this initial position and any other stable position there will be an odd number of binary edges for the two codings and a simple division by two will not make it possible to correctly count the variations of stable positions notably upon reversal of the direction of motion of the coder.

SUMMARY OF THE INVENTION

The invention facilitates the standardization of a coder in applications where the number of positions can vary.

For this purpose, an object of the invention is to provide a coder making it possible to count up or to count down, in a dependable way, multiple positions of a base binary coding.

Another object of the invention is to provide an incremental coder in which stable positions of the coder are defined by multiples of an increment of the coder. The coder computes a difference between a binary word obtained for a current stable position and a binary word obtained for a previous stable position, and computes the value of variation of stable positions by determining the integer part of the division of the difference by the number of increments between two stable positions.

It is a further object of the present invention to provide a an incremental coder comprising a movable element and a fixed element, two sensors secured to the fixed element, a succession of marks secured to the movable element that can be detected by the sensors during the motion of the movable element with respect to the fixed element, means of binary coding representing the detection and the absence of detection of the marks by the sensors, the coding arising from one sensor being phase-shifted with respect to the coding of the other sensor, a change of binary value of one of the codings defining an interval of the coder, the codings forming a binary word, stable positions of the coder being defined by multiples of the coder interval, and means for defining a value of variation of stable positions of the coder on the basis of the binary word, characterized in that it comprises a memory containing a number of intervals between two stable positions and in that the means for defining a current stable position of the coder compute a difference between a binary word obtained for a current stable position and a binary word obtained for a previous stable position, and compute the value of variation of stable positions by determining the integer part of the division of the difference by the number of intervals between two stable positions.

A coder in accordance with the invention improves the robustness of the information that it delivers. The information will be reliable whatever the initial position on which the coder starts and whatever the position on which the coder stops. These positions may be stable positions or intermediate positions. By determining the integer part of the division it is made possible to always keep the stable position immediately lower than the stopping position. The expression lower position is understood to mean a position whose binary word has a lower value in a direction of rotation defined as positive.

The invention makes it possible to manage reversals of direction of displacement of the movable element without any "dead" position during reversal. The expression dead position is understood to mean a stable position which is not taken into account in the information delivered by the coder.

It is a further object of the present invention to provide a method for determining a value of variation of stable positions of a coder comprising a movable element and a fixed element, two sensors secured to the fixed element, a succession of marks secured to the movable element that can be detected by the sensors during the motion of the movable element with respect to the fixed element, means of binary coding representing the detection and the absence of detection of the marks by the sensors, the coding arising from one sensor being phase-shifted with respect to the coding of the other sensor, a change of binary value of one of the codings defining an interval of the coder, the codings forming a binary word, stable positions of the coder being defined by multiples of the coder interval, characterized in that it consists in:
  computing a difference between a binary word obtained for a current stable position and a binary word obtained for a previous stable position,
  dividing the difference by the number of intervals between two stable positions.
  determining the integer part of the result of the division.

BRIEF DESCRIPTION OF THE DRAWINGS

The invention will be better understood and other advantages will become apparent on reading the detailed description of an embodiment given by way of example, which description is illustrated by the appended drawing in which.

For the sake of clarity, the same elements will bear the same labels in the various figures.

DETAILED DESCRIPTION

Figure 1:
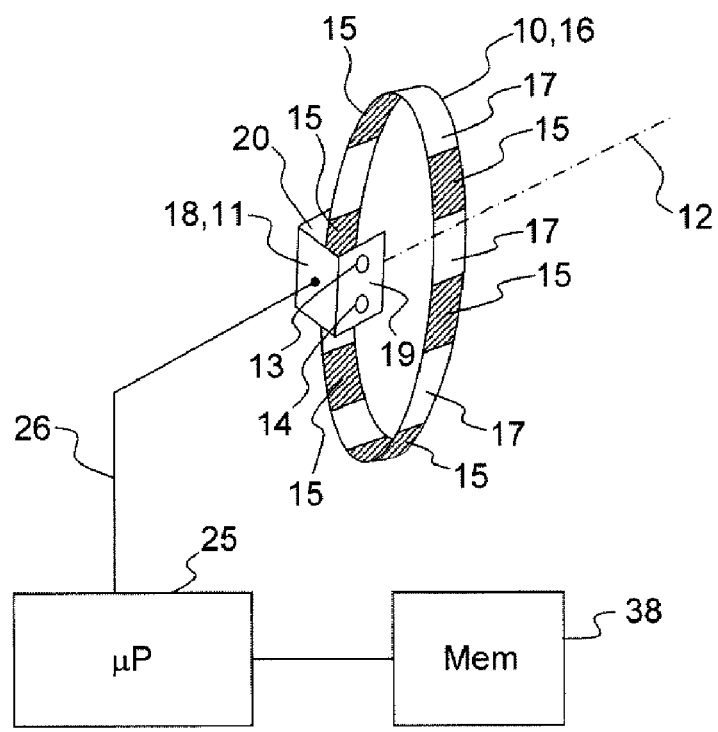
FIG. 1 schematically represents an incremental coder in accordance with the invention.

FIG. 1 represents a rotary coder comprising a movable element 10 that can move with respect to a fixed element 11. The movable element 10 is for example a button that a user can rotate about an axis 12 so as to enter an item of data into an electronic item of equipment. The fixed element 11 is secured to a housing of the coder which may be fixed in an electronic item of equipment. The coder allows for example an operator to enter data used by the item of equipment. The invention is described in relation to a rotary coder but can equally well be implemented in a linear coder.

A rotary coder is for example used in an onboard aerial navigation instrument embedded in an aircraft instrument panel. In the course of a flight, the pilot of an aircraft may have to adjust an altimeter determining the altitude thereof with respect to the pressure of the air surrounding the aircraft. In the cruising phase, the altitude is given with respect to a standard pressure of the atmosphere and in the approach phase the altitude is determined with respect to the atmospheric pressure of the destination airport. This change of barometric reference can be entered by means of a rotary coder according to the invention.

Certain onboard navigation instruments, such as backup instruments, possess a screen on which may be displayed either flight information such as the altitude, the speed and the attitude of the aircraft or navigation parameters such as the route to be followed and automatic-piloting setpoints for the aircraft. As was seen above, a rotary button situated on the front face of the instrument may be used to reference the altitude when flight parameters are displayed. This same button may be used to input navigation data such as for example the coordinates of a next waypoint for the aircraft. The rotary button actuates the coder which makes it possible to manage increments and decrements. Stated otherwise, the coder must give an item of information about the angle traversed by the button secured to the movable element 10 and about the direction of rotation of the button.

The fixed element 11 comprises two sensors 13 and 14 and the movable element 10 comprises a succession of marks 15 that can be detected by the sensors 13 and 14 during the motion of the movable element 10 with respect to the fixed element 11. The marks 15 are for example opaque zones mounted on a circular element 16 that can rotate about the axis 12 during an actuation of an operator. On the circular element 16, the opaque zones 15 are separated by transparent zones 17 forming absences of marks. The marks 15 and the absences of marks 17 are advantageously regularly distributed around the axis 12. The two sensors 13 and 14 are for example photodiodes mounted on a U-shaped support 18. The circular element 16 moves between the two branches 19 and 20 of the U. The sensors 13 and 14 are arranged on the branch 19 and emitters, for example light-emitting diodes, are arranged on the opposite branch 20. The support 18 is constructed in such a way that one of the sensors 13 or 14 can detect the light emitted by just one of the emitters. More generally, the two sensors 13 and 14 detect the various marks 15 separately. In the example represented, the two sensors 13 and 14 are arranged in one another's vicinity on one and the same support 18. Other arrangements are conceivable, such as for example the construction of two supports 18 placed in a diametrically opposite manner with respect to the axis 12 and each bearing a sensor 13 or 14.

In FIG. 1, only essential parts of the elements 11 and 12 have been schematically represented. It is of course understood that the coder comprises other mechanical parts such as for example a housing forming the fixed element 11, and a bearing allowing the movable element 10 to rotate with respect to the housing. The coder also comprises a button secured to the circular element 16. The button is intended to be actuated by an operator using the coder to enter data.

Signals emitted by each of the sensors 13 and 14 are transmitted to a computer 25 through a link 26.

Figure 2:
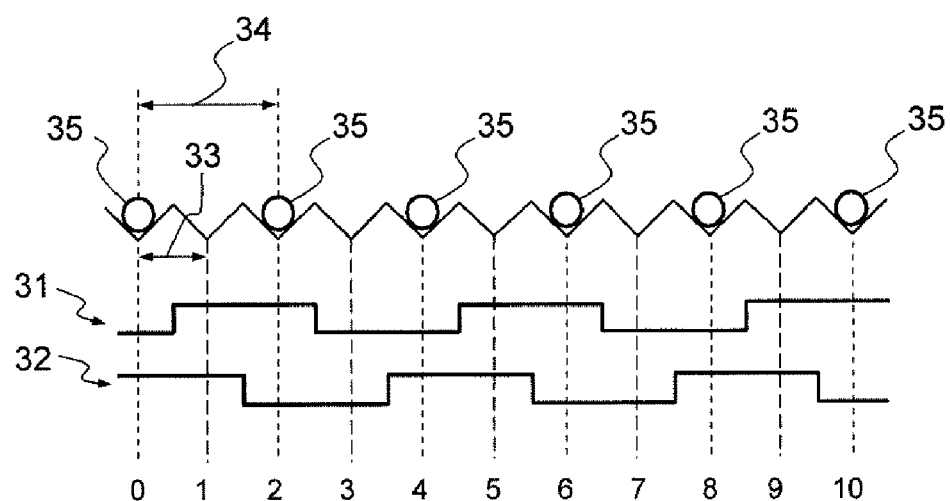
FIG. 2 represents a binary coding arising from sensors of the coder.

FIG. 2 illustrates a binary coding arising from the signals emitted by each of the sensors 13 and 14. In this figure the succession of the various increments of the coder during the motion of the movable element is represented as abscissa. This representation is appropriate for a linear coder and also for a rotary coder for which the increments are strung together in a cyclic manner.

Ten increments are represented in FIG. 2. Binary codings 31 and 32 arising from each of the sensors 13 and 14 are associated with each increment. In practice, the signals arising from the sensors 13 and 14 do not exhibit perfect edges. Suitable filtering makes it possible to reconstitute edges so as to obtain binary codings exhibiting transitions that are as steep as possible. Between two successive increments of the coder, only one of the binary codings 31 or 32 changes binary value. A distance separating two increments forms an interval 33 of the coder. This distance may be linear or angular depending on whether the coder is linear or rotary. The distances separating two successive intervals are advantageously equal. In FIG. 2, an interval 33 separating the increments 0 and 1 is represented.

Stated otherwise, the coding arising from one sensor is phase-shifted with respect to the coding of the other sensor. A change of binary value of one of the codings 31 and 32 defines the interval 33 of the coder. The codings 31 and 32 form a binary word.

The coder comprises for example a succession of 32 marks 15 each separated by an absence of mark 17. These 32 marks make it possible to define 64 increments of the coder. These increments are defined by the construction of the circular element 16 and of the associated support 18. A benefit of the invention is to allow the reuse of the circular element 16 and of the support 18 for coders comprising fewer increments, for example 16 or 32. Accordingly, the coder retains the maximum number of increments and it comprises means for defining stable positions in lower number than the total number of increments. The number of stable positions is a sub-multiple of the number of increments. Stated otherwise, an interval 34 between stable positions is a multiple of the interval 33 between increments. In FIG. 2, the stable positions are obtained for each even increment. The interval 34 between stable positions is equal to twice the interval 33 between increments.

The means for defining stable positions comprise, for example, for a rotary coder, a disc secured to the movable element 10 drilled at the interval 34, the disc being centred on the axis 12 and perpendicular to the latter. The fixed element 11 comprises a ball thrust by a linear spring whose axis is parallel to the axis 12. The ball can penetrate in part into each of the holes of the disc. A stable position of the coder is obtained each time the ball is in a hole of the disc. To modify the number of stable positions of the coder, it suffices to change the disc without changing the circular element 16. More generally, the stable positions correspond to notching positions in which the movable element 10 must necessarily be positioned, optional intermediate positions being unstable. The coder flips automatically to the closest stable position.

In FIG. 2, each stable position is represented schematically with a ball 35 positioned at the level of the even increments.

The coder comprises means for defining a value of variation of stable positions of the coder on the basis of the binary word. The variation may be positive or negative. The binary word may be expressed on several bits for example 8 bits. The value of the word can then vary between 0 and 255. This value is called the acquisition value. Another value, termed the computed value, corresponds to the variation of the number of stable positions since the last acquisition.

During enabling thereof, the word corresponding to the stable position which the coder is in can take any value between 0 and 255. To obtain an absolute positioning with respect to the initial position during enabling, the computer 25 assigns a computed value 0 for this initial position.

Let us assume a coder with two increments between two stable positions and let us suppose that the initial acquisition value is 1. A first movement of the coder takes it to a first current stable position corresponding to a first current acquisition of value 8. In practice the difference between the two acquisitions would have to be a multiple of the number of increments between two stable positions. This difference ought to be even. But the case can occur where the coder stops between two stable positions and gives a different acquisition value from that of the two stable positions surrounding its stopping position. In our example, it is assumed that the initial position is situated between two stable positions.

To count the number of stable positions passed during the first movement, the following operation is performed:

First of all a subtraction between the binary word corresponding to the first current acquisition minus the initial acquisition 1: 8−1=7. This result, divided by the number of increments between two stable positions, 2 in this example, becomes the new computed value: 7/2=3. One is in fact dealing with a binary division which takes no account of the digits situated after the decimal point. This corresponds to a displacement of: +3 stable positions.

Thereafter, a value of new acquisition is determined and is stored for the following acquisition cycle: twice the computed value is added to the acquisition stored at the previous cycle, that is to say the initial acquisition 1: 1+(3×2)=7.

A second movement of the coder takes it to a second current stable position corresponding to a second current acquisition of value 6. This second movement is performed in the reverse direction to the first movement.

The subtraction between the second acquisition and the acquisition stored at the previous cycle gives: 6−7=−1

Thereafter, this result is divided by the number of increments between two stable positions: −1/2=0.

The displacement corresponding to −1 stable position is not observed. More generally, it is noted that each time that the direction of displacement of the movable element 10 is reversed, a counting error is obtained, corresponding to a stable position which is not taken into account. This reasoning may be extrapolated for any other ratio between the number of stable positions and the number of increments as long as the initial acquisition does not correspond to a stable position.

To alleviate this problem, the invention makes provision to determine the integer part of the division described above. The expression integer part of the division is understood to mean the integer immediately lower than the decimal result of the division. For example, if the division gives a result of 1.5 then the integer part of the division gives 1. For a negative example, if the division gives a result of −1.5 then the integer part of the division gives −2.

The implementation of the invention requires only very few memory locations, a location for the number of increments between two stable positions and a location for the last computed value. The memory containing these two items of information bears the label 38 in FIG. 1. This representation is solely functional and does not prejudge the type of component used. Indeed, it is possible to distinguish the number of increments between two stable positions which is a set item of data for a coder. This data item may be stored in a read only memory, such as for example a memory in which a program executed by the computer 25 is also stored. Moreover the computer 25 and the read only memory can belong to one and the same component of microcontroller type. On the other hand, the last computed value is an item of information intended to vary each time that the coder is actuated. It is therefore advantageous to store this information in a random access memory or at least in a rewritable memory.

Figure 3:
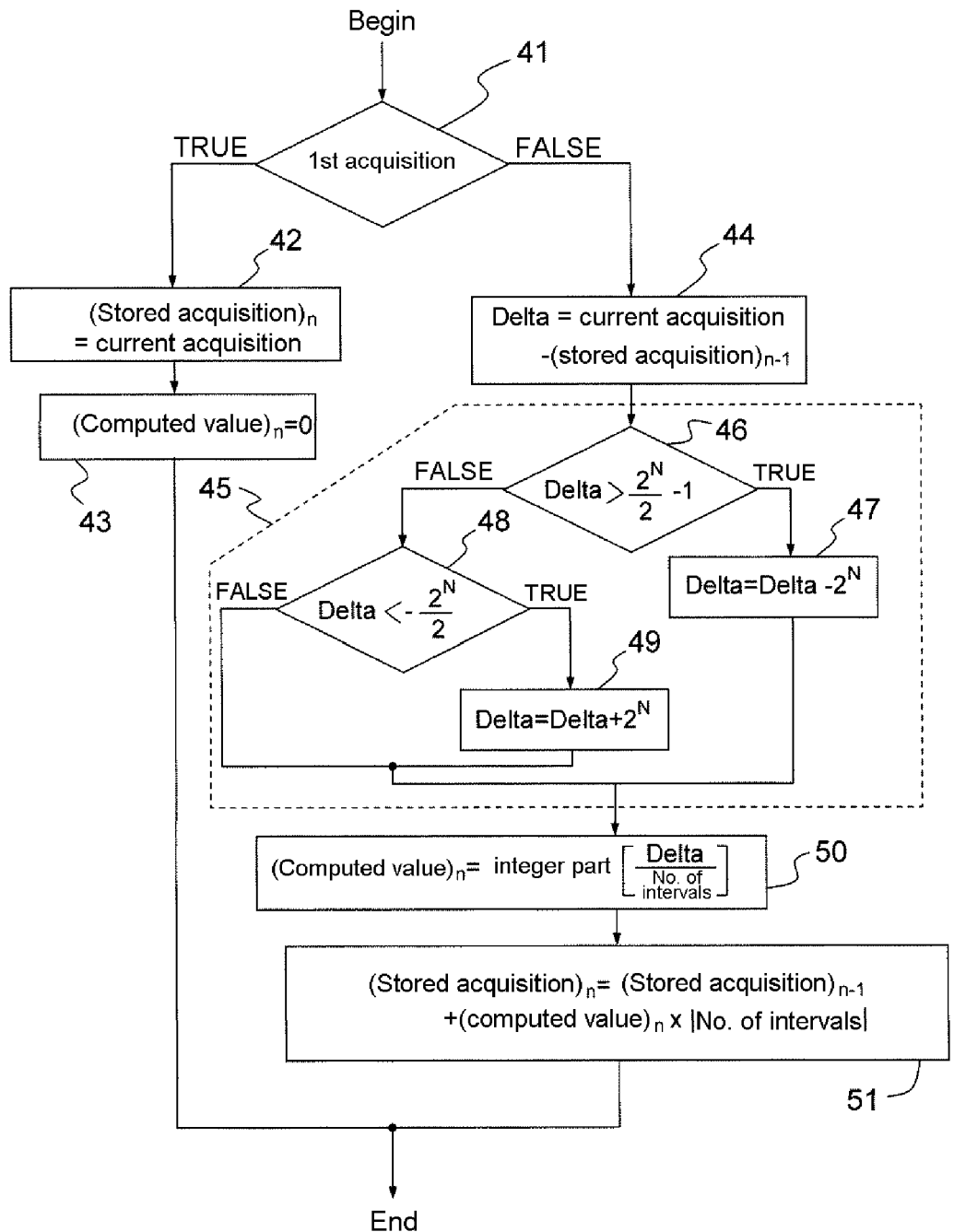
FIG. 3 represents a flowchart making it possible to determine a value of variation between two stable positions of the coder represented in FIG. 1.

FIG. 3 represents a flowchart implementing the invention. This flowchart represents an acquisition cycle, that is to say an acquisition of the binary word arising from the sensors 13 and 14 as well as the processing associated with this acquisition for obtaining the number of stable positions that the coder has traversed from the previous cycle corresponding to the previous acquisition.

A first step is a test 41 making it possible to verify whether the coder has already been actuated since it was powered up or more generally since it was started up. In the case of a first acquisition, the result of the test 41 is "TRUE" and the current acquisition is stored in a location designed to store the acquisition. This location is denoted (Stored acquisition)$_n$, where n represents the rank of the processing cycle for the algorithm of FIG. 3. This storage action is represented at box 42. Thereafter, at box 43, 0 is allotted to the value computed at rank n, this corresponding to the initial position of the coder. On exiting step 43, the cycle terminates.

During a subsequent cycle, the result of the test 41 is "FALSE" and the test 41 is followed by a step 44 in the course of which a difference "Delta" is computed between the current acquisition and the acquisition stored at the previous cycle and denoted (Stored acquisition)$_{n-1}$.

Thereafter in a group of steps 45, the difference Delta is advantageously reduced so as to lie inside a probable bracket. More precisely, the binary word, grouping together the codings arising from the two sensors 13 and 14, is coded on N bits, for example 8 bits, this representing 256 possible values. For this purpose, the coder comprises a memory making it possible to code the binary words on N bits. If, between two successive acquisitions, we pass through the value 0, the difference will not be representative of the number of stable positions actually traversed between the two acquisitions. To alleviate this problem, the coder comprises means for reducing the difference to a value less than $2^N/2$ in absolute value to modulo $2^N$. It is indeed considered that a difference Delta which is greater than $2^N/2$ in absolute value is not possible, which would correspond to several coder revolutions performed between two cycles. In practice an acquisition cycle may be effected in a few tens of milliseconds and be repeated with this period, thus ruling out the possibility of making several revolutions between two acquisitions. An example of carrying out this group of steps 45 is given in FIG. 3.

After step 44, during a test 46, Delta is compared with $(2^N/2)-1$. If Delta is greater than $(2^N/2)-1$, then $2^N$ is deducted from Delta. This subtraction is done in step 47. If on the other hand Delta is not greater than $(2^N/2)-1$, a new test 48 is performed where Delta is compared with $-2^N/2$. If Delta is less than $-2^N/2$, then $2^N$ is added to Delta. This addition is performed in step 49. If Delta is not less than $-2^N/2$, the value of Delta obtained in step 44 is retained.

On exiting the group of steps 45, where the value of Delta may possibly have been corrected, the number of stable positions separating the current acquisition at the present cycle from the current acquisition at the previous acquisition cycle is determined during a step 50. This number of stable positions, denoted (Computed value)$_n$ is a relative integer, that is to say it can be positive or negative. The computed value is equal to the integer part of the division of the difference, determined in step 44 and then possibly corrected in the group of steps 45, by the number of intervals between two stable positions.

Finally during a step 51, a new stored acquisition is determined for the present cycle. This stored acquisition will be used for the next acquisition cycle. More precisely, the stored acquisition for the present cycle, denoted (Stored acquisition)$_n$, is equal to the stored acquisition for the previous cycle, denoted (Stored acquisition)$_{n-1}$, to which is added the value computed in step 50 multiplied by the absolute value of the number of intervals.

It was seen above that the number of intervals of the coder corresponds to the number of increments of the coder between two stable positions. In practice, so as to allow easy reuse of a coder for several applications, it is possible to define a positive or negative number of intervals. If for example during a clockwise rotation of the coder, a positive number of intervals corresponds to a positive count of the value computed in step 50, the same rotation of the coder will correspond to a negative count if the number of intervals is negative. Stated otherwise, the number of intervals is signed and a change of sign makes it possible to reverse the count of the stable positions.

It will be readily seen by one of ordinary skill in the art that embodiments according to the present invention fulfil many of the advantages set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. An incremental coder comprising:
a movable element and a fixed element, two sensors secured to the fixed element, a succession of marks secured to the movable element that can be detected by the sensors during the motion of the movable element with respect to the fixed element, means of binary coding representing the detection and the absence of detection of the marks by the sensors, the coding arising from one sensor being phase-shifted with respect to the coding of the other sensor, a change of binary value of one of the codings defining an interval of the coder, the codings forming a binary word, stable positions of the coder being defined by multiples of the coder interval, and means for defining a value of variation of stable positions of the coder on the basis of the binary word, the coder further comprising a memory containing a number of intervals between two stable positions, wherein the means for defining a current stable position of the coder compute a difference between a binary word obtained for a current stable position and a binary word obtained for a previous stable position, and compute the value of variation of stable positions by determining the integer part of the division of the difference by the number of intervals between two stable positions.

2. The coder according to claim 1, further comprising a memory making it possible to code the binary words on N bits, and further comprising means for reducing the difference to a value less than $2^N/2$ in absolute value to modulo $2^N$.

3. The coder according to claim 1, wherein the coder is rotary about an axis and in that the marks and the absences of marks are regularly distributed around the axis.

4. The coder according to claim 1, wherein the number of intervals is signed.

5. A method for determining a value of variation of stable positions of a coder comprising:
a movable element and a fixed element, two sensors secured to the fixed element, a succession of marks secured to the movable element that can be detected by the sensors during the motion of the movable element with respect to the fixed element, means of binary coding representing the detection and the absence of detection of the marks by the sensors, the coding arising from one sensor being phase-shifted with respect to the coding of the other sensor, a change of binary value of one of the codings defining an interval of the coder, the codings forming a binary word, stable positions of the coder being defined by multiples of the coder interval, the method including the steps of computing a difference between a binary word obtained for a current stable position and a binary word obtained for a previous stable position;
dividing the difference by the number of intervals between two stable positions; and
determining the integer part of the result of the division.

6. The method according to claim 5, wherein the binary words are coded on N bits, in that if the difference is greater than $2^N/2$, then $2^N$ is deducted from the difference before performing the division and wherein if the difference is less than $2^N/2$, then $2^N$ is added to the difference before performing the division.

* * * * *